United States Patent [19]

Gartner

[11] Patent Number: 4,561,225

[45] Date of Patent: Dec. 31, 1985

[54] CURTAIN WALL UNITS IN A UNIT TYPE CURTAIN WALL

[75] Inventor: Karl Gartner, Gundelfingen, Fed. Rep. of Germany

[73] Assignee: Yoshida Kogyo K.K., Tokyo, Japan

[21] Appl. No.: 519,209

[22] Filed: Aug. 1, 1983

[30] Foreign Application Priority Data

Aug. 10, 1982 [JP] Japan .................................. 57-138896

[51] Int. Cl.$^4$ .............................................. E04H 1/00
[52] U.S. Cl. ....................................... 52/220; 52/235; 165/50
[58] Field of Search ............. 52/235, 220, 731, 173 R; 138/115; 165/50

[56] References Cited

U.S. PATENT DOCUMENTS

| | | | |
|---|---|---|---|
| 3,280,530 | 10/1966 | Rothenbach | 52/731 |
| 3,409,766 | 11/1968 | Meckler | 52/220 |
| 3,415,024 | 12/1968 | Kotlarz | 52/235 |
| 4,203,487 | 5/1980 | Gartner | 165/50 |
| 4,305,430 | 12/1981 | Svensson | 138/115 |

Primary Examiner—John E. Murtagh
Attorney, Agent, or Firm—Hill, Van Santen, Steadman & Simpson

[57] ABSTRACT

A standardized curtain wall unit is disclosed which is intended for use with any required number of other similar curtain wall units to provide a unit type curtain wall assembly capable of room temperature control. The curtain wall unit comprises a plurality of frame members joined into a rectangular shape, defining openings which are closed by double glazing or like panels or panes. All the frame members are of identical cross-sectional shape, with a passageway for a heat transfer fluid and a mounting recess formed longitudinally therethrough in side-by-side relation to each other. The fluid passageway is disposed inwardly of the mounting recess, or closer to the middle of the curtain wall unit, and the mounting recess is open outwardly. This cross-sectional shape of the frame members offers several advantages in constructing the unit type curtain wall assembly from a plurality of such curtain wall units and auxiliary parts such as seals, couplings, and piping.

4 Claims, 5 Drawing Figures

CURTAIN WALL UNITS IN A UNIT TYPE CURTAIN WALL

BACKGROUND OF THE INVENTION

This invention relates to a prefabricated curtain wall unit for combined use with other like units to provide a unit type curtain wall assembly. The unit type curtain wall assembly comprised of the prefabricated curtain wall units in accordance with the invention has a room temperature control function.

The prefabricated unit type curtain wall assembly has been known which comprises a plurality of standardized curtain wall units arranged in rows and columns. There have also been known such unit type curtain wall assemblies having a built-in temperature control or air conditioning system for the rooms enclosed thereby. Japanese Patent Application No. Sho 57-133764, filed by the same applicant as in the present application, represents an example of unit type curtain wall assembly capable of room temperature control. According to this system disclosed in the separate application, the horizontal and vertical frame members of the standardized curtain wall units have passageways extending longitudinally therethrough for the flow of a heat transfer fluid as in the form of hot or cold water. The heat transfer fluid radiates its heat energy into the room or absorbs a heat of air through the frame members.

In the curtain wall units for use in this unit type curtain wall assembly, the passageways for the heat transfer fluid must be so arranged in the frame members as to result in the most efficient liberation of the heat energy into the room. Additional considerations must go into the design of the frame members of the curtain wall units, which are to be interconnected in rows and columns by the interposition of seals, couplings, heat insulators, and piping for the circulation of the heat transfer fluid. The frame members should allow ready connection of such auxiliary means thereto.

Above all, the frame members of the curtain wall units should be universal, that is, all the frame members, both horizontal and vertical, should be of the same cross-sectional shape for the reduction of manufacturing cost.

SUMMARY OF THE INVENTION

The present invention provides a prefabricated curtain wall unit of improved construction wherein all the frame members are of the same cross-sectional shape. The cross-sectional shape of the frame members is such that the heat energy of the heat transfer fluid flowing through passageways created therein can be radiated most efficiently into a room to make possible the air conditioning or temperature control of the room with the least energy required. Further, the frame members allow ready connection thereto of various ancillary means normally incorporated in the unit type curtain wall assembly of the type under consideration.

Stated broadly, the prefabricated curtain wall unit in accordance with the invention comprises a plurality of frame members combined into a generally rectangular shape and having panel means mounted thereto. The frame members are all of identical cross-sectional shape, with each frame member having formed longitudinally therethrough a passageway for a heat transfer fluid and a mounting recess which are in side-by-side relationship to each other. The fluid passageway in each frame member is positioned inwardly of the mounting recess, that is, on the inner side of a frame member surrounded by end walls, or closer to the middle of the curtain wall unit, whereas the mounting recess is open outwardly on the outer side of the frame member, or away from the middle of the curtain wall unit.

The above cross-sectional shape of the frame members offers a number of advantages. Among these is the fact that since the passageway for the heat transfer fluid lies inwardly of the mounting recess, the heat energy of the fluid can be radiated inwardly, or toward the opening or openings defined by the frame members, rather than outwardly, for the effective use of the energy for room temperature control.

Opening outwardly, the mounting recess in each frame member allows ready connection or engagement thereof with auxiliary curtain wall parts such as a sealing strip and interior panel. Further the side-by-side arrangement of the mounting recess with the fluid passageway gains the advantage of permitting easy connection of piping used for intercommunicating the fluid passageways in some of the frame members.

The above and other features and advantages of this invention and the manner of attaining them will become more apparent, and the invention itself will best be understood, from a study of the following description and appended claims, with reference had to the attached drawings showing a preferable embodiment of the invention.

DESCRIPTION OF THE PREFERRED EMBODIMENT

Figure 1:
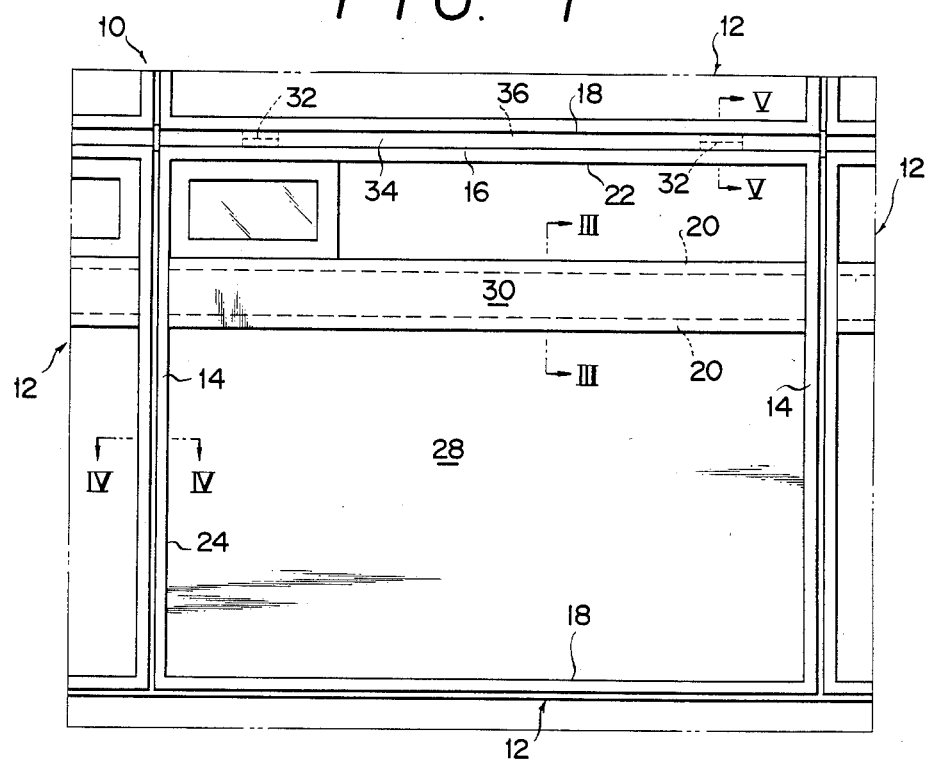
FIG. 1 is a fragmentary elevation of an example of unit type curtain wall assembly built from a plurality of prefabricated curtain wall units each embodying the principles of this invention.

The examplified unit type curtain wall assembly is generally designated 10 in FIG. 1. It comprises a plurality of prefabricated curtain wall units 12 arranged in rows and columns. Each curtain wall unit 12 has a pair of vertical side frame members 14, a horizontal top frame member 16, and a horizontal bottom frame members 18, which are connected into a rectangular shape. Each curtain wall unit 12 further comprises a pair of intermediate frame members 20 extending horizontally between the pair of side frame members 14. Thus, the rectangular opening for a window bounded by the side, top and bottom frame members 14, 16 and 18 is divided by the pair of intermediate frame members 20 into an upper opening 22 and lower opening 24. These openings 22 and 24 are closed by panels or panels 26 and 28, respectively, of double glazing or other suitable heat insulating material. Thus, the upper and lower openings 22 and 24 are formed as a heat radiating or heat absorbing space. Another panel 30 of any desired heat insulating material closes the space between the pair of intermediate frame members 20.

FIG. 1 also indicates that very two vertically adjoining ones of the curtain wall units 12 have their bottom frame member 18 and top frame member 16 interconnected by a pair of horizontally spaced apart couplings 32. Disposed on the outdoor side of each pair of couplings 32 is a stringcourse 34 extending along the seam between the vertically adjoining curtain wall units 12 for rainproofing the seam. Both couplings 32 and stringcourse 34 will be later described in more detail. On the indoor side of each stringcourse 34 a thermal insulating material 34 fills the gap between the vertically adjoining curtain wall units 12 except, of course, the spaces occupied by the couplings 32.

Figure 2:
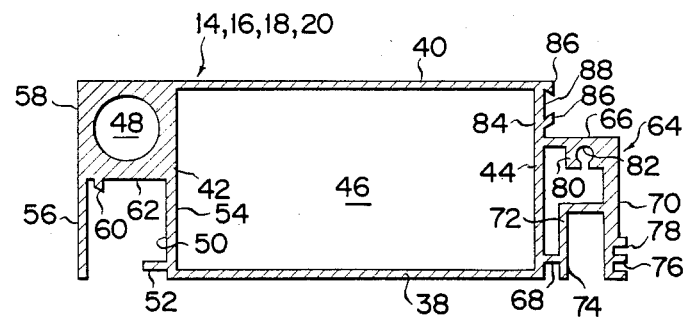
FIG. 2 is an enlarged cross section through any of the frame members of each curtain wall unit of FIG. 1.

In accordance with a feature of the invention the above recited frame members 14, 16, 18 and 20 of each curtain wall unit 12 are all of exactly the same cross-sectional shape depicted on an enlarged scale in FIG. 2. The following paragraphs deal with the cross-sectional shape of the frame members in detail.

Each frame member 14, 16, 18, 20 is hollow and substantially rectangular in cross-sectional shape. It has a pair of side walls 38 and 40 and a pair of end walls 42 and 44, defining in combination a first passageway 46 of rectangular cross section for the flow of warm or cool air to be expelled into a room through vents, not shown, suitably positioned on the frame members. The end wall 42 is thicker than the other end wall 44. Formed longitudinally through this thickened end wall 42 is a second passageway 48 of circular cross section for the flow of a heat transfer fluid as in the form of hot or cold water. The second passageway 48 is located closer to one side of the end wall 42 to make room for a mounting recess 50 also formed therein. Thus, cross-sectionally, the first passageway 46 occupies a major portion of the frame member, and the second passageway 48 and mounting recess 50 are arranged adjacent one end of the frame member in side-by-side relation to each other.

In the following description and in the claims appended hereto, the terms "exterior" and "interior" are intended to refer to the directions toward the outside and toward the inside, respectively, of the unit type curtain wall assembly 10 in planes normal to the plane of the unit type curtain wall assembly. Further the terms "inner" and "outer", as well as "inward" and "outward", as applied to the side, top and bottom frame members 14, 16 and 18 refer to the directions toward and away from, respectively, the middle of each curtain wall unit 12 in its own plane. As applied to the upper one of the pair of intermediate frame members 20, the terms "inner" and "outer", as well as "inward" and "outward", refer to the directions toward and away from, respectively, the middle of the upper opening 22. Similarly, as applied to the lower one of the intermediate frame members 20, the terms "inner" and "outer", as well as "inward" and "outward", refer to the directions toward and away from, respectively, the middle of the lower opening 24.

Thus, since the left hand end of the frame member as shown in FIG. 2 is to be directed toward the inside of the unit type curtain wall assembly 10, the second passageway 48 and mounting recess 50 are spoken of as being adjacent the interior end of the frame member. Further the second passageway 48 lies inwardly of the mounting recess 50, and this mounting recess is open outwardly, as will be better understood as the description progresses.

With reference directed further to FIG. 2 the mounting recess 50 in the interior end wall 42 of each frame member is defined in part by a flange 52 projecting interiorly from a thin portion 54 of the interior end wall and by another flange 56 formed in coplanar relation to the interior surface 58 of the interior end wall. These flanges 52 and 56 are dimensioned to leave the mounting recess 50 open outwardly. A ridge 60 projects outwardly to a comparatively short extent from a surface 62 bounding the inner end of the mounting recess 50.

The exterior end wall 44 of each frame member has a mounting portion 64 formed integral therewith on its exterior side. The mounting portion 64 is of hollow construction, including an inner side wall 66, an outer side wall 68, and an end wall 70. Longer than the outer side wall 68, the inner side wall 66 is joined directly to the end wall 70 whereas the outer side wall is joined to the end wall via an L-shaped portion 72. This L-shaped portion coacts with the end wall 70 in defining a mounting groove 74 which is open outwardly.

The end wall 70 of the mounting portion 64 is further adapted to define two mounting grooves 76 and 78 which are in parallel spaced relation to each other and which are both open exteriorly. The junction of the inner side wall 66 and end wall 70 is thickened at 80 to provide a screw hole 82. The exterior end wall 44 of each frame member has a portion 84 left exposed by the mounting portion 64. This exposed portion of the exterior end wall has a pair of parallel spaced ridges 86 defining an undercut groove 88.

Figure 3:
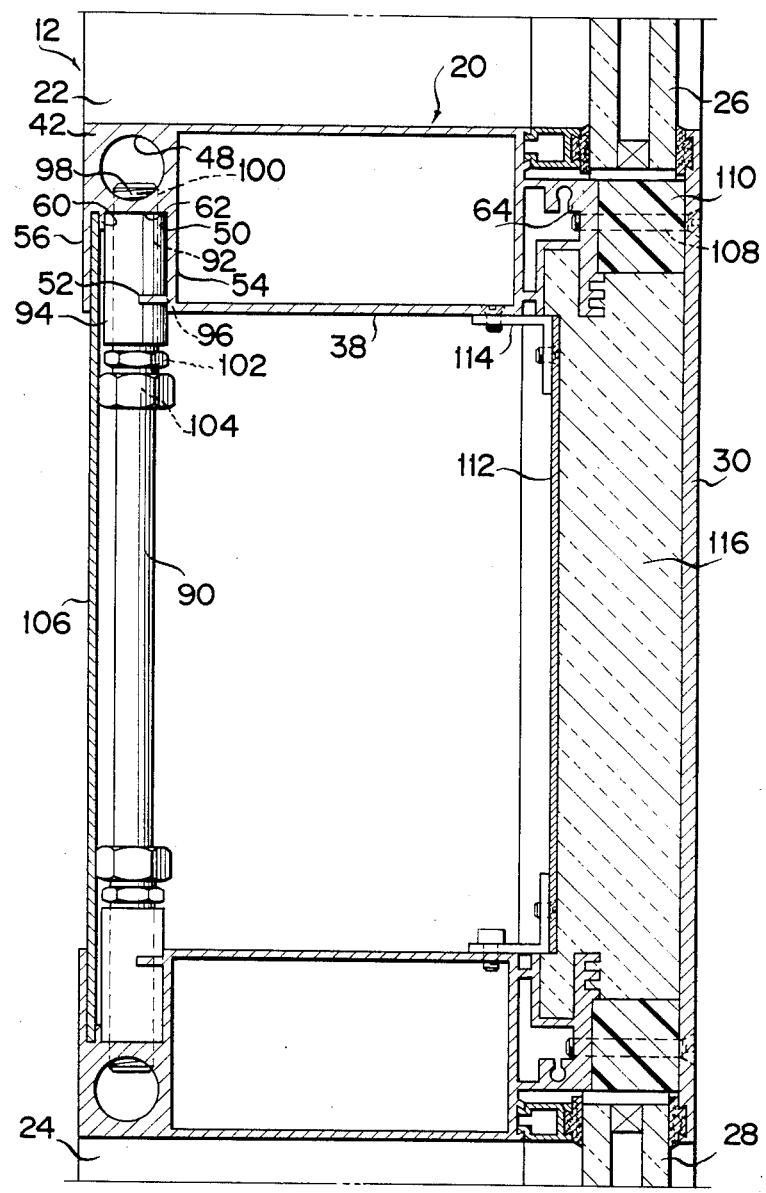
FIG. 3 is an enlarged, fragmentary vertical section through each curtain wall unit of FIG. 1, taken along the line III—III therein and showing in particular a pair of intermediate frame members together with associated means.

FIG. 3 shows the pair of intermediate frame members 20, each cross-sectionally configured as in FIG. 2, of each prefabricated curtain wall unit 12 together with a pipe 90 for intercommunicating the heat transfer fluid passageways 48 in the frame members. Extending vertically between the pair of intermediate frame members 20, the pipe 90 is coupled to the interior end walls 42 of the frame members via short connector pipes 92 extending through guide sleeves 94.

For mounting one of the guide sleeves 94 in the mounting recess 50 of each intermediate frame member 20, the flange 52 is recessed at 96, and the guide sleeve is inserted in the mounting groove 50 into abutment against its inner end wall 62. Thus mounted in position, the guide sleeve 94 guides the subsequent insertion of the connector pipe 92 into the mounting recess 50. The connector pipe 92 has a threaded end portion 98 projecting out of the guide sleeve 94 and engaged in a tapped hole 100 in the interior end wall 42 to extend into the heat transfer fluid passageway 48. The connector pipe 92 has another threaded end portion 102 in fluid-tight engagement with a threaded end portion 104 of the pipe 90. Thus the pipe 90 intercommunicates the heat transfer fluid passageways 48 in the pair of intermediate frame members 20 via the connector pipes 92.

Each guide sleeve 94 is caught between the thin portion 54 and ridge 60 of interior end wall 42 of one intermediate frame member 20. An interior panel 106 closes the space between the pair of intermediate frame members 20 on its interior side by having its opposite edges engaged between the flanges 56 and ridges 60 of the frame members.

It will have been seen from the foregoing that the pair of intermediate frame members 20 allow ready connection of the pipe 90 therebetween for intercommunicating the heat transfer fluid passageways 48 therein. The ready connection of the pipe 90 has become possible by reason of the mounting grooves 50 which are open outwardly, or toward each other in the case of the pair of intermediate frame members 20.

FIG. 3 further reveals that the panel 30 is fastened by countersunk screws 108 to the mounting portions 64 of the pair of intermediate frame members 20 via a pair of heat insulating members 110. Interiorly of this panel 30 another panel 112 is rigidly mounted to the opposed side walls 38 of the intermediate frame members 20 via respective angle brackets 114. A mass of thermal insulating material 116 fills the space between the panels 30 and 112.

Figure 4:
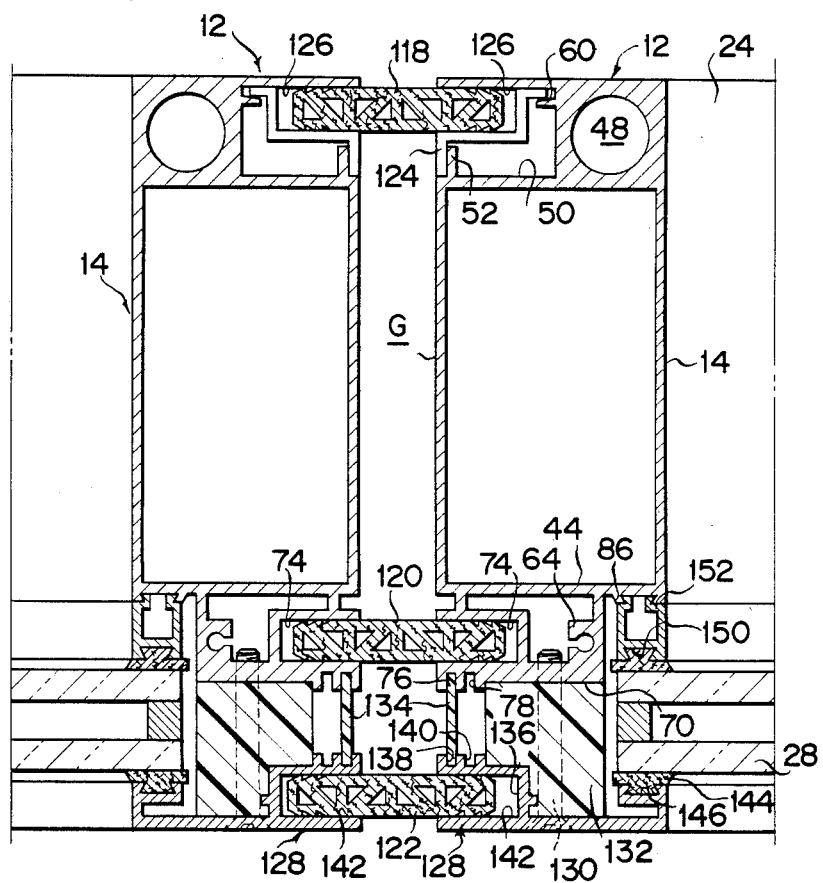
FIG. 4 is an enlarged, fragmentary horizontal section through the unit type curtain wall assembly of FIG. 1, taken along the line IV—IV therein and showing in particular the opposed side frame members of the two horizontally adjoining curtain wall units together with associated means.

Shown in FIG. 4 are the two opposed side frame members 14 of any two horizontally neighboring curtain wall units 12 in the unit type curtain wall assembly 10 of FIG. 1. Each having the cross-sectional shape explained in connection with FIG. 2, the two opposed side frame members 14 are arranged with a preassigned gap G therebetween, with their mounting recesses 50 opening outwardly or toward each other. The heat transfer fluid passageways 48 are of course positioned inwardly of the mounting recesses 50.

The gap G between the opposed side frame members 14 is closed by three sealing bands of elastic material. These are an interior sealing band 118 on the interior side of the gap G and first and second exterior sealing bands 120 and 122 on the exterior side of the gap.

Fixedly mounted in the mounting recess 50 in each side frame member 14 is an approximately W-shaped mounting member or members 124 which are in engagement with the flange 52 and ridge 60. The mounting member or members 124 define in combination with the flange 56 a mounting groove 126 open to the gap G between the two frame members 14. The interior sealing band 118 is supported by having its opposite marginal edge portions engaged in the pair of opposed mounting grooves 126 in the side frame members 14, thus closing the gap G therebetween on its interior side.

The first exterior sealing band 120 has its opposite marginal edge portions engaged in the pair of opposed mounting grooves 74 in the mounting portions 64 of the side frame members 14. The gap G is thus closed on its exterior side by the first exterior sealing band 120.

A retainer strip 128 is secured as by countersunk screws 130 to the end wall 70 of the mounting portion 64 of each side frame member 14 via two connectors 132 and 134 of thermal insulating material. The retainer strip 128 has an L-shaped flange 136 directed interiorly therefrom and having formed therein two mounting grooves 138 and 140 in opposed relation to the respective mounting grooves 76 and 78 in the end wall 70 of the mounting portion 64. The heat insulating connector 132 is of approximately square shaped cross section, recessed along one corner for engagement with the L-shaped flange 136. The other heat insulating connector 134 takes the form of a thin strip having its lateral edge portions snugly fitted in the mounting groove 76 in the mounting portion 64 and in the mounting groove 138 in the L-shaped flange 136.

The retainer strip 128 coacts with the L-shaped flange 136 in defining a mounting groove 142 which is also open outwardly. The aforesaid second exterior sealing band 122 has its opposite marginal edge portions engaged in the pair of opposed mounting grooves 142 associated with the two opposed side frame members 14. The second exterior sealing band 122 lies exteriorly of the first exterior sealing band 120 with a closed space therebetween. The combination of the three sealing bands 118, 120 and 122, with the two intervening closed spaces, effectively prevents heat flow through the gap G between the opposed side frame members 14.

FIG. 4 is further illustrative of the way in which each pane of double glazing 28 is peripherally supported by each side frame member 14. The supporting means include an exterior sealing strip 144 engaged in an undercut groove 146 in the retainer strip 128 and held against the exterior face of the double glazing 28. An interior sealing strip 148, held against the interior face of the double glazing 28, is engaged in an undercut groove 150 in a spacer 152 which in turn is engaged between the pair of ridges 86 on the exterior end wall 44 of the side frame member 14.

Figure 5:
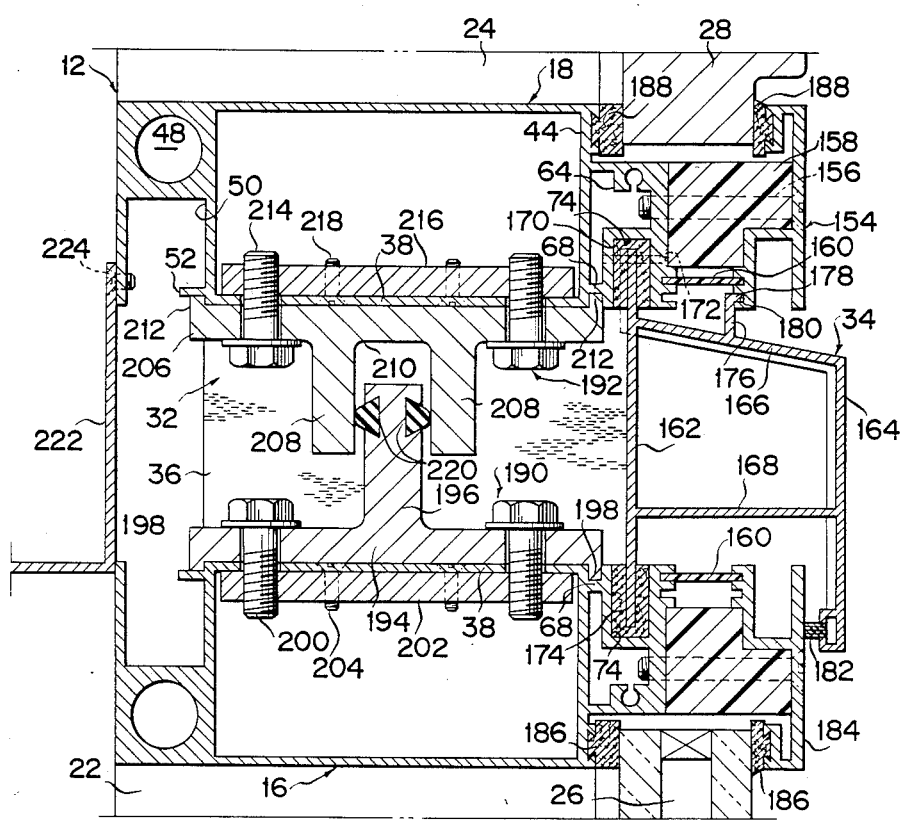
FIG. 5 is an enlarged, fragmentary vertical section through the unit type curtain wall assembly of FIG. 1, taken along the line V—V therein and showing in particular the opposed bottom and top frame members of the two vertically adjoining curtain wall units together with the associated means.

FIG. 5 illustrates the bottom frame member 18 of one curtain wall unit 12 and the top frame member 16 of the underlying curtain wall unit, together with one of the pair of couplings 32 and the stringcourse 34 therebetween. Each having the cross-sectional shape of FIG. 2, the two opposed frame members 16 and 18 are arranged with a suitable spacing therebetween, with their mounting recesses 50 opening outwardly or toward each other and with their heat transfer fluid passageways 48 held opposite to the openings 22 and 24 of the curtain wall units 12.

Disposed exteriorly of the pair of couplings 32, the stringcourse 34 functions to rainproof the seam between the two vertically adjoining curtain wall units 12. The stringcourse 34 is mounted to the two opposed frame members 16 and 18 by the following means.

A pair of retainer strips 154 are secured to the mounting portions 64 of the opposed frame members 16 and 18 by countersunk screws 156 via connectors 158 and 160 of thermal insulating material. The stringcourse 34 comprises an inner vertical wall 162, an outer vertical wall 164, a sloping top 166, and a horizontal bottom 168. Extending upwardly beyond the top 166, the inner wall 162 of the stringcourse 34 has its top edge engaged in the mounting groove 74 in the mounting portion 64 of the bottom frame member 18 via a sealing strip 170. Countersunk screws 172 rigidly connect the top edge of the inner wall 162 to the mounting portion 64. The inner wall 162 of the stringcourse 34 also extends downwardly beyond its bottom 168 to be engaged in the mounting groove 74 in the mounting portion 64 of the top frame member 16 of the lower curtain wall unit via a sealing strip 174. A mounting fin 176 extends upwardly from the middle of the sloping top 166 of the stringcourse 34. A rim 178 bent exteriorly from the top of the mounting fin 176 is engaged in a groove 180 defined in the retainer strip 154 on the bottom frame member 18 of the upper curtain wall unit. The outer wall 164 of the stringcourse 34 extends downwardly beyond its bottom 168 and carries along its bottom edge a sealing strip 182 which butts on the exterior surface 184 of the retainer strip 154 on the top frame member 16 of the lower curtain wall unit.

As is clear from the foregoing, the stringcourse 34 is rigidly fastened to the bottom frame member 18 of the upper curtain wall unit on the one hand and, on the other, is engaged with the top frame member 16 of the lower curtain wall unit for relative displacement in the plane of the unit type curtain wall assembly. The mounting portions 64 of the opposed side frame members 16 and 18 are well designed to allow the ready mounting of the stringcourse 34 for closing the space therebetween on its exterior side by way of rainproofing.

The pane or panel 26 closing the upper opening 22 of each curtain wall unit has its upper edge engaged between the exterior end wall 44 of the top frame member 16 and the retainer strip 154 via a pair of sealing strips 186. The pane or panel 28 closing the lower opening 24 of each curtain wall unit has its lower edge engaged between the exterior end wall 44 of the bottom frame member 18 and the retainer strip 154 via a pair of sealing strips 188.

Each coupling 32 comprises a male member 190 fastened to the top frame member 16 of one curtain wall unit, and a female member 192 fastened to the bottom frame member 18 of the overlying curtain wall unit.

The male member 190 of each coupling 32 comprises a mounting base 194 held flatwise against the outer side wall 38 of the top frame member 16, and an upstanding tongue 196 erected on the mounting base so as to be in the vertical plane containing the unit type curtain wall assembly. The mounting base 194 has a pair of side rims 198 directed downwardly from its opposite sides into abutting engagement with the flange 52 and side wall 68 of the top frame member 16. Screw bolts 200 pass through aligned holes in the mounting base 194 of the male member 190 and in the outer side wall 38 of the top frame member 16 and are threadedly engaged in tapped holes in a backing 202 which is fastened to the inside surface of the outer side wall 38 as by countersunk screws 204.

The female member 192 of each coupling 32 comprises a mounting base 206 in direct contact with the outer side wall 38 of the bottom frame member 18, and a pair of ridges 208 depending from the mounting base 206 to define therebetween a groove 210 slidably receiving the tongue 196 of the male member 190. The mounting base 206 of the female member 192 also has a pair of side rims 212 directed upwardly from its opposite sides into abutting engagement with the flange 52 and side wall 68 of the bottom frame member 18. Further the mounting base 206 is secured to the bottom frame member 18 as by screw bolts 214 which are threadedly engaged with a backing 216 fastened to the inside surface of the outer side wall 38 of the bottom frame member as by countersunk screws 218.

Thus, in the pair of horizontally spaced couplings 32 between every two vertically adjoining curtain wall units, the upstanding tongues 196 of the male members 190 are slidably engaged in the grooves 210 in the female members 192. Since the tongues 196 and grooves 210 are both contained in the vertical plane of the unit type curtain wall assembly, the pair of couplings 32 allow the relative displacement of the two curtain wall units in every direction in their own plane but positively restrain them from relative displacement out of that plane.

Preferably, in order to avoid metal-to-metal contact of the male and female members 190 and 192, a pair of contact strips 220 of nonmetallic, wear resistant material may be embedded in the tongue 196 of each coupling 32 on its opposite sides. The contact strips 220 serve to prevent the production of squeaks and the galling of the mating parts.

As has been mentioned, the mass of thermal insulating material 36 is packed in the space bounded by the opposed frame members 16 and 18 of every two vertically adjoining curtain wall units and by the stringcourse 34 therebetween. At 222 is seen a connector plate screwed at 224 to the bottom frame member 18.

It is to be understood that a variety of changes may be made in the form, details, arrangements, and proportions of the parts without departing from the spirit or scope of the invention.

What is claimed is:

1. A prefabricated curtain wall unit for combined use with other like units to provide a unit type curtain wall assembly, the curtain wall unit comprising panel means, and a plurality of top, bottom, and side frame members combined into a generally rectangular shape and having the panel means mounted thereto, the frame members being all of identical cross-sectional shape, each frame member having formed longitudinally therethrough a passageway for a heat transfer fluid and a mounting recess in side-by-side relation to each other, with the passageway positioned inwardly of the mounting recess and with the mounting recess being open outwardly for connecting to a further frame member in a further adjacent curtain wall unit, and each frame member having further formed longitudinally therethrough a second passageway for warm or cool air, the second passageway occupying a major portion of the frame member, and wherein the first recited passageway and the mounting recess are positioned interiorly of the second passageway, and a mounting portion positioned exteriorly of the second passageway for connection of the frame member at least to the panel means.

2. A prefabricated curtain wall unit for combined use with other like units to provide a unit type curtain wall assembly, the curtain wall unit comprising a top and a bottom frame member and a pair of side frame members joined into a rectangular shape, a pair of intermediate frame members extending horizontally in parallel spaced relation to each other between the pair of side frame members and defining in combination with the top, bottom and side frame members an upper and a lower opening, and panel means closing the upper and lower openings and the space between the pair of intermediate frame members, the top, bottom, side, and intermediate frame members being all of identical cross-sectional shape, each frame member having formed longitudinally therethrough a passageway for a heat transfer fluid and a mounting recess in side-by-side relation to each other, with the passageway positioned inwardly of the mounting recess and with the mounting recess being open outwardly.

3. The prefabricated curtain wall unit of claim 2 wherein each frame member has further formed longitudinally therethrough a second passageway for conditioning air, the second passageway occupying a major portion of each frame member, and wherein the first recited passageway and the mounting recess are positioned interiorly of the second passageway.

4. The prefabricated curtain wall unit of claim 3 wherein each frame member further comprises a mounting portion located exteriorly of the second passageway for connection of the frame member at least to the panel means.

* * * * *